(12) United States Patent
Assimos, II et al.

(10) Patent No.: US 7,299,327 B2
(45) Date of Patent: Nov. 20, 2007

(54) CONTENT-ON-DEMAND MEMORY KEY WITH POSITIVE ACCESS EVIDENCE FEATURE

(75) Inventors: Charles Assimos, II, Cary, NC (US); James G. McLean, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 11/061,205

(22) Filed: Feb. 18, 2005

(65) Prior Publication Data

US 2006/0190690 A1    Aug. 24, 2006

(51) Int. Cl.
*G06F 12/00*    (2006.01)

(52) U.S. Cl. .................. 711/163; 711/103; 711/115; 711/152; 713/194; 326/8

(58) Field of Classification Search ............. 711/100, 711/105, 151, 152, 163, 115, 164, 102, 103, 711/104; 713/194; 382/115; 326/8; 200/61.19, 200/61.93, 43.16, 43.19; 705/51, 52
See application file for complete search history.

(56) References Cited

U.S. PATENT DOCUMENTS

| | | | | |
|---|---|---|---|---|
| 3,508,205 | A * | 4/1970 | Kubie ....................... 711/164 |
| 4,685,056 | A * | 8/1987 | Barnsdale et al. .......... 711/164 |
| 4,691,350 | A * | 9/1987 | Kleijne et al. .............. 713/194 |
| 4,744,062 | A | 5/1988 | Nakamura et al. |
| 4,783,801 | A * | 11/1988 | Kaule ....................... 713/194 |
| 4,833,650 | A | 5/1989 | Hirayama et al. |
| 5,012,659 | A * | 5/1991 | Eisermann ................ 70/276 |
| 5,081,675 | A | 1/1992 | Kittirutsunetorn |
| 5,083,293 | A | 1/1992 | Gilberg et al. |
| 5,101,121 | A * | 3/1992 | Sourgen .................... 326/8 |
| 5,448,045 | A * | 9/1995 | Clark ....................... 235/382 |
| 5,826,235 | A * | 10/1998 | Harman .................... 704/500 |
| 5,835,781 | A * | 11/1998 | Van de Steeg et al. ..... 712/1 |
| 5,943,283 | A | 8/1999 | Wong et al. |
| 6,253,273 | B1 * | 6/2001 | Blumenau .................. 710/200 |
| 6,757,832 | B1 * | 6/2004 | Silverbrook et al. ....... 713/194 |
| 6,765,470 | B2 * | 7/2004 | Shinzaki ................... 340/5.52 |
| 6,826,667 | B2 * | 11/2004 | Chen et al. ................ 711/163 |
| 6,952,759 | B2 * | 10/2005 | Scott et al. ................ 711/163 |
| 7,039,816 | B2 * | 5/2006 | Kocher et al. ............. 713/194 |

(Continued)

*Primary Examiner*—Gary Portka
*Assistant Examiner*—Carl Brienen
(74) *Attorney, Agent, or Firm*—Martin McKinley, Esq.; Steven M. Greenberg, Esq.; Carey Rodriguez Greenberg & Paul LLP

(57) ABSTRACT

A method, system and apparatus for identifying unauthorized access to memory locations in a multi-element data storage device. The invention includes a restrictive key that is physically coupled to at least one inaccessible memory element in the data storage device. The key prevents the user from accessing the data in that element. A securing device connects the restrictive key to the data storage device's housing. When the key is altered from its initial position, the securing device is broken. Because the securing device is at least partially located on the outside of the device housing, it is readily visible. Therefore, if the securing device has been broken, the key to which the securing device was coupled was necessarily moved. This provides visual evidence that there has been an attempt to access one or more data memory areas that had been previously been rendered inaccessible by the restrictive key.

13 Claims, 2 Drawing Sheets

U.S. PATENT DOCUMENTS

| | | | |
|---|---|---|---|
| 2003/0126386 A1* | 7/2003 | Lakhani et al. | 711/159 |
| 2003/0150753 A1* | 8/2003 | Fraser et al. | 206/308.1 |
| 2003/0191948 A1* | 10/2003 | Nelson et al. | 713/185 |
| 2004/0049464 A1* | 3/2004 | Ohmori et al. | 705/51 |
| 2004/0134994 A1* | 7/2004 | Zaba et al. | 235/492 |
| 2004/0205314 A1* | 10/2004 | Babudri et al. | 711/163 |
| 2005/0021279 A1* | 1/2005 | Kuepper et al. | 702/127 |
| 2005/0050352 A1* | 3/2005 | Narayanaswami et al. | 713/201 |
| 2005/0097338 A1* | 5/2005 | Lee | 713/186 |
| 2005/0278228 A1* | 12/2005 | Schultz | 705/26 |
| 2006/0204047 A1* | 9/2006 | Dave et al. | 382/115 |
| 2006/0277551 A1* | 12/2006 | Accapadi et al. | 718/107 |

* cited by examiner

CONTENT-ON-DEMAND MEMORY KEY WITH POSITIVE ACCESS EVIDENCE FEATURE

BACKGROUND OF THE INVENTION

1. Statement of the Technical Field

The present invention relates to data storage devices and more particularly to a method and system for preventing unauthorized access to one or more proprietary storage areas on the data storage device and for providing irreversible physical evidence that one or more proprietary storage areas of the storage device has been accessed.

2. Description of the Related Art

While compact discs and DVDs proved to be preferred data storage medium of the 1990s, solid state data storage devices such as USB memory keys, Flash Direct Access Storage Devices (DASDs), or Portable External Memory/Storage Packages (PEMPs) are likely to supplant compact discs in the $21^{st}$ Century as the preferred means of distributing and storing digital information. USB memory sticks have become very popular due to their many advantages over traditional storage devices like floppy disks, ZIP disks, and CD-ROMs. Memory sticks, also known as Flash drives, are small, lightweight, portable devices about the size of a highlighter pen and typically store between 1 MB to 1 GB of data. Similar devices are evolving with much higher storage capabilities. Their transfer rates (about 1 MB/sec), portability, and solid state design (no moving parts to become damaged) provide enormous advantages over traditional storage devices.

However, memory sticks are not without inherent problems. The size and portability of memory sticks allow the devices to be lost, misplaced, or stolen rather easily. If misplaced and discovered by a third party, there is little in the way of security features that would prevent the person from accessing data on the device. Further, unlike compact discs, such devices may contain multiple independent storage locations. Providing a user with access to the storage device gives them access to all areas on the device even if some areas contain proprietary information. When a USB device is accessed, there is no indication as to which portion or portions of the device was accessed.

Although there exist methods, via software, that restrict access to certain portions of the data storage device, if the software is hacked, there is currently no method to verify the unauthorized access to those locations on the device since current methods cannot detect evidence of such unauthorized activity. For example, some devices require the entry of a password to obtain access to specified storage areas. Clever software hackers can circumvent this type of protective measure and access the protected areas.

There are many circumstances where access to certain areas of the data storage device should be prohibited. For example, a user may wish to view a movie trailer or hear a clip from a song prior to committing to the purchase of the entire movie or song. In these instances, the user is presented with a media storage device and can freely access the trailer or clip as often as they wish. If they choose to purchase the full length movie or song, they must first complete a financial transaction. After the user has paid for their selection, software programmed in the device's processor may then remove the protection that was preventing access to the full media file. A little ingenuity and reverse engineering can give a software hacker physical access to these files without leaving a trace.

In another scenario, employees may be entrusted to take home flash memory devices containing work-related files in order to work from home. The flash memory may also contain files that the employee is not allowed to access. Technically inclined, disgruntled or over-curious employees can access client lists, sales forecasts or research data that may be on the flash memory device and return the storage device to their employers, who are none the wiser. Accessing these proprietary files via software techniques leave no trace.

Other solutions may prohibit access to the entire data storage medium (i.e., shrink wrap around a CD), and one must break the seal around the storage medium to access the medium's entire contents. This is not a practical solution when some areas of the medium contain proprietary information or data that is prohibited from user access prior to the completion of a financial transaction. While other solutions might allow access to particular portions of a data storage or memory device, it is often desirable to obtain evidence that such access has occurred in the cases where the access was unauthorized. Such evidence is important for software providers or personal electronic player manufacturers to identify users that have attempted to "play without paying". Software solutions, electrical solutions, or reversible mechanical solutions do not readily provide lasting evidence of unauthorized access.

It is therefore desirable to have a system and method that prevent content of specific areas of a solid state data storage device or memory storage medium from being accessed "on demand" while providing lasting physical evidence that the specific area has been accessed.

SUMMARY OF THE INVENTION

The present invention addresses the deficiencies in the art with respect to data storage accessibility and provides a novel and non-obvious method, system and apparatus for preventing the unauthorized access of specific locations of a data storage medium and for providing irreversible evidence that such unauthorized access was attempted. In this regard, a restrictive key is constructed within the storage device, the key coupled to one or more data storage areas. A securing device couples the key to the housing of the data storage device. Removal or altering of the position of the key breaks the securing device, which provides visual evidence that the key was removed and an attempt was made to access the unauthorized areas.

According to one aspect, the present invention provides a system for identifying unauthorized access of portions of a data storage device. The system includes a solid state data storage device having an inner and outer surface. The data storage device includes one or more independent memory elements, and a restrictive key coupled to the one or more data memory elements. The key restricts access to the one or more memory elements. The key is alterable from a first position to at least a second position such that physically altering the position of the key provides access to the one or more memory elements to which the key is coupled.

According to another aspect, the present invention provides an apparatus for providing evidence of access to one or more unauthorized memory elements within a data storage device, the storage device having an inner and outer surface. The apparatus includes a mechanically manipulative flange coupled to the one or more memory elements. The flange restricts access to the one or more memory elements, wherein the flange is alterable from a first position to at least a second position such that physically altering the position of the flange provides access to the one or more memory elements to which the flange is coupled.

According to still another aspect, a method of providing evidence of access to unauthorized memory locations within a data storage device is provided. The method includes coupling a restrictive key to one or more unauthorized memory locations within the data storage device, where the key restricts access to the one or more memory locations. The key is alterable from a first position to at least a second position such that physically altering the position of the key provides access to the one or more memory locations to which the key is coupled.

According to yet another aspect of the invention, a method identifying unauthorized access to data in a storage media is provided. The storage media includes one or more memory locations containing data that is prohibited from access. The method includes providing a customer with the storage media, receiving the storage media back from the customer, and examining indicia on the storage media to determine whether the one or more prohibited memory locations has been accessed.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention advantageously provides a method, system and apparatus of preventing access to particular areas of a solid state memory or data storage device and for providing physical evidence that particular areas of the device were accessed. A solid state memory device typically includes a plurality of individually accessible memory elements. While some of the elements are freely accessible, other elements may contain proprietary information and are "locked", thereby preventing unwanted and unauthorized access thereto. The invention provides a mechanical solution by including a restrictive key that prevents access to one or more memory elements. The mechanical action of removing or altering the position of the restrictive key causes a change in the electrical characteristics of the device, thus providing access to the previously inaccessible element or elements. The removal or altering of the key's position is irreversible and provides lasting physical evidence indicating access to the proprietary element or elements.

Figure 1:
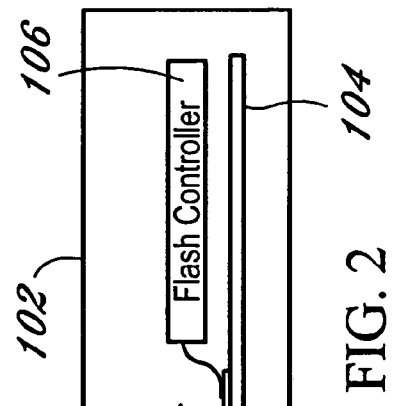
FIG. 1 is a side view of the principal components of the present invention.

Referring now to the drawing figures in which like reference designators refer to like elements there is shown in FIG. 1 a system constructed in accordance with the principles of the present invention and designated generally as "100". Data storage device 102 contains one or more independent memory elements. Data storage device 102 may be any electronic data storage device capable of storing data such as a Portable External Memory/Storage Package (PEMP), USB flash memory, or a Flash Direct Access Storage Device (DASD). Device 102 encompasses both solid state and bubble memory storage devices and can also include magnetic and optical storage devices.

Data content is contained in separate memory elements on printed circuit board (PCB) 104. PCB 104 may contain one or more memory elements, some of which contain freely-accessible data while others contain proprietary information that is not accessible to the user. Each memory element can represent either physical memory or logical memory. An example of a data storage device compatible with the present invention is a media device that contains a trailer to a movie. The user is free to access and view the movie trailer but must purchase the actual movie before viewing it. Thus, the movie content is inaccessible until the user is granted access to it.

A programmable controller 106 controls operation of device 102. A restrictive access key 108 prevents access to one or more memory elements on PCB 104. Key 108 may be any mechanical device that, when in an initial position, prevents access to data in one or more memory elements of PCB 104. Exemplary keys may be a plastic or metal pin, or metal or plastic tape. Typically, key 108 is installed during the packaging phase of manufacturing of device 102. When key 108 is removed or its position altered, the data in the memory elements that were protected by the key become accessible. Key 108 need not be entirely removed to expose protectable memory elements. The memory elements may become accessible merely by rotating key 108 or partially pulling the key from its initial position in order to provide access to data in the exposed memory elements.

In FIG. 1, key 108 prevents access to one or more memory elements on PCB 104. Electrical conductor 110 is connected between ground pad 112 and flash controller 106. As long as the circuit is not enabled, controller 106 prevents unauthorized access to one or more memory elements in PCB 104. However, once the electrical circuit is enabled, controller 106 becomes enabled and can no longer prevent access to proprietary data contained on PCB 104.

Figure 2:
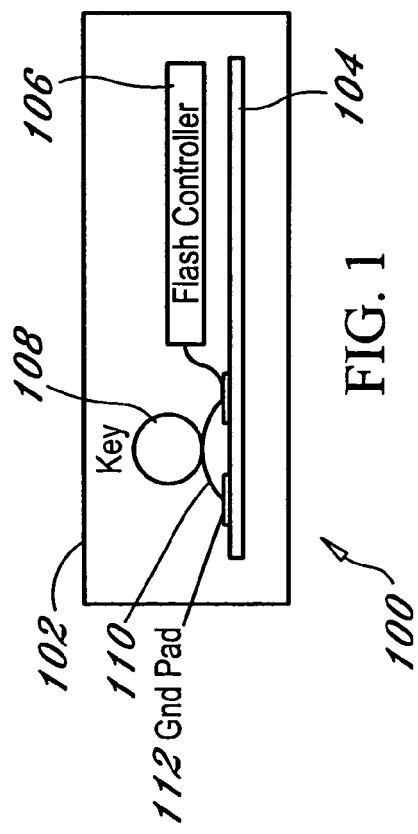
FIG. 2 is a side view of the principal components of the present invention after removal of the restrictive key.

FIG. 2 illustrates the result of removing or altering the position of key 108. The result is that conductor 110 is no longer connected to controller 106. The removal of key 108 opens the circuit which had connected controller 106 to ground 112. Without controller 106 inhibiting access to proprietary data on PCB 104, a user is free to access all content in device 102.

Figure 3:
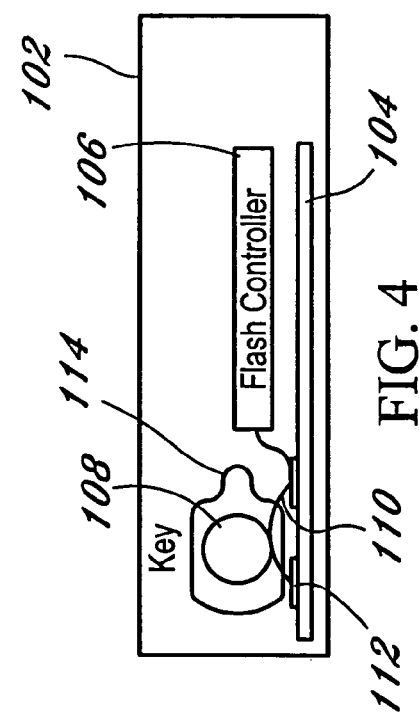
FIG. 3 is a rear view of the principal components of the present invention including a securing device coupling the key to the housing.
Figure 4:
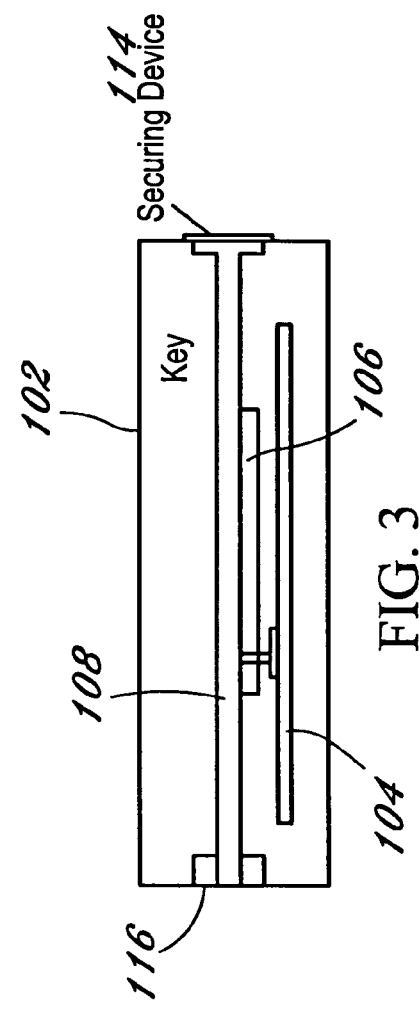
FIG. 4 is a side view of the principal components of the present invention including a securing device coupling the key to the housing.

FIGS. 3 and 4 illustrate an embodiment of the present invention whereby a securing device 114 is incorporated into device 102, preferably during manufacture of data storage device 102. Key 108 is shown to run the substantial length of device 102, although it need not do so. Key 108 is secured to the side of the housing of device 102 by securing device 114. Securing device 114 may be any material that removably affixes key 108 to the external housing of device 102. In the example shown in FIG. 3, securing device 114 may be a tab or tape that affixes key 108 to device 102. The housing of device 102 is preferably modified during manufacture at entrance point 116 to incorporate and accept key 108. Key 108 prevents access to certain data stored in one or more data elements on PCB 104. If a user attempts to remove key 108 in order to gain access to inaccessible portions of device 102, securing device 114, which secures an end of key 108 to an exterior wall of device 102, is broken. This provides visual evidence that key 108 has been removed and device 102 has been tampered with.

Key 108 need not be of the elongated shape and dimension shown in FIG. 3. The illustration in FIG. 3 is the exemplary embodiment showing a typical key 108 and its relationship to the housing of device 102. Key 108 can be any suitable shape such as the shape of a pin, or be in the form of metalized tape. Regardless of the dimensions of the key, key 108 is positioned such that it prevents access to certain portions of PCB 104.

FIG. 4 represents a side view of device 102. In this figure, one end of key 108 can be seen. As in FIG. 1, key 108 prevents access to conductor 110, which provides an electrical connection between controller 106 and ground 112. The presence of the key 108 prevents access to data on PCB 104. Therefore, with key 108 in position, controller 106 will not respond to a request to access data from a protected address and/or will provide an error message indicating that the request for data is directed toward an invalid memory address.

In FIG. 4, securing device 114 can be seen surrounding the end of key 108. By removing key 108, device 114 becomes separated from the housing of device 102. The broken external securing device 114 provides instant physical evidence that device 102 has been tampered with, and more specifically, that (1) key 108 has been removed, (2) the disabling circuit feeding the controller 106 and pad 112 has been opened, and (3) the proprietary data files on PCB 104 once previously inaccessible, are now accessible.

Figure 5:
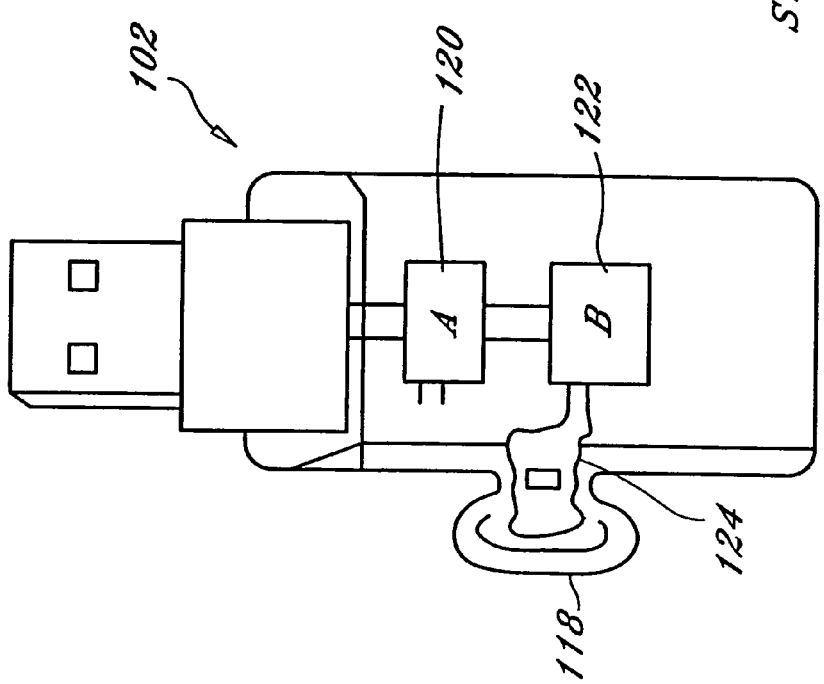
FIG. 5 top view of an alternate embodiment of the present invention including a securing tab disabling access to a specific storage area.

FIG. 5 illustrates an alternate embodiment of the invention. In this embodiment, key 108 is represented by a breakable tab 118 that is molded into the plastic housing of device 102. The plastic tab 118 may be molded during the manufacture of the housing of device 102. Elements A and B represent two distinct memory locations, either logical or physical, within device 102. The example may be expanded to include A through N distinct memory elements. In the scenario shown in FIG. 5, element A 120 includes data that is available to the user without restriction, while element B 122 includes data that is considered proprietary and not accessible to the user.

A wire or other electrical conductor 124 is embedded in tab 118 such that an electrical circuit is maintained in one state so long as tab 118 remains intact. For example, while tab 118 remains intact, a chip select line connected to memory element B 122 is held low, or "inactive", thus disabling the contents of element B 122. If tab 118 is broken, the circuit opens, and the chip select line is pulled "high", or "active", thus enabling element B 122 and rendering accessible the contents therein. Device 102 may utilize any internal logic scheme to enable controller 106 upon a particular physical action taken by the user, provided the physical action, i.e., breaking tab 118, takes place outside the device housing so it can be readily seen.

The present invention is not limited to a specific size and shape of key 108, or even to the number of keys in device 102. For example, while FIG. 5 can be expanded upon to include additional independent memory elements B through N, device 102 may also include multiple keys 108, wherein each key 108 is connected to a corresponding element within device 102. Thus, there may be many tabs 118, each enclosing circuitry that will either disable the contents of the data element it is associated with (i.e. when tab 118 is intact), or enable the data element to allow access to its contents (i.e., when tab 118 is broken).

In yet an alternate embodiment, one tab 118 may prevent access to more than one memory element. By breaking tab 118, more than one data memory element may be enabled. One way this can be accomplished is by routing a chip select line through elements A through N, and embedding the conductors from this line in one tab 118. In this scenario, when tab 118 is broken, the chip select line is switched from inactive to active, thus enabling each memory area and the data therein.

Regardless of the type, shape or size of key 108, or whether a tab 118 is used, or the key 108 is secured to the housing of device 102 by a securing device 114, the present invention provides physical evidence when one or more memory areas in a data storage device have been accessed. During manufacture of the data storage device 102, when it is decided which memory elements are to be inaccessible to the user, one or more keys 108 or tabs 118 may be inserted to prevent access to the chosen elements. Thus, the present invention also discloses a method for preventing the unwanted access of one or more memory areas within a data storage device and for providing lasting physical evidence that an attempt has been made to access the memory areas.

The method includes identifying the one or more memory locations that are to be declared "off limits" and thus inaccessible to the user. These locations may contain proprietary information that the manufacturer does not want a user to access until the user has paid to access the contents of those files. One or more keys 108 are provided to prevent access to these proprietary locations. The key or keys may further include a securing device 114 that is integral with the housing of the storage device 102. Multiple keys 108 will result in multiple securing devices 114 where each key 108 is secured to device 102 via a securing device 114. Upon a user's action, i.e. physically removing or altering the location of key 108, securing device 114 is separated from the housing of device 102. Because the resulting separation of device 114 is irreversible and visually noticeable, it is possible to identify when an unauthorized attempt to access proprietary data has occurred.

The data storage device 102 described herein can take many forms. For example, it may be a personal electronic device such as an MP3 player with several pre-stored musical selections to allow the user to become familiar with the device controls. However, the write feature is initially disabled to prevent the user from adding his or her own songs and storing them on the MP3 player. The user may be required to agree to the terms of a purchase or license agreement before being allowed to copy songs onto the device. Only by removing and/or breaking the securing device can the user bypass the agreement and enable the write feature. This may be an attractive promotional scheme for electronic device manufacturers. Users get the opportunity to try out the device before purchasing it. The present invention provides evidence that the user has attempted to write songs on the MP3 player without first agreeing with the manufacturer's purchase requirements.

Figure 6:
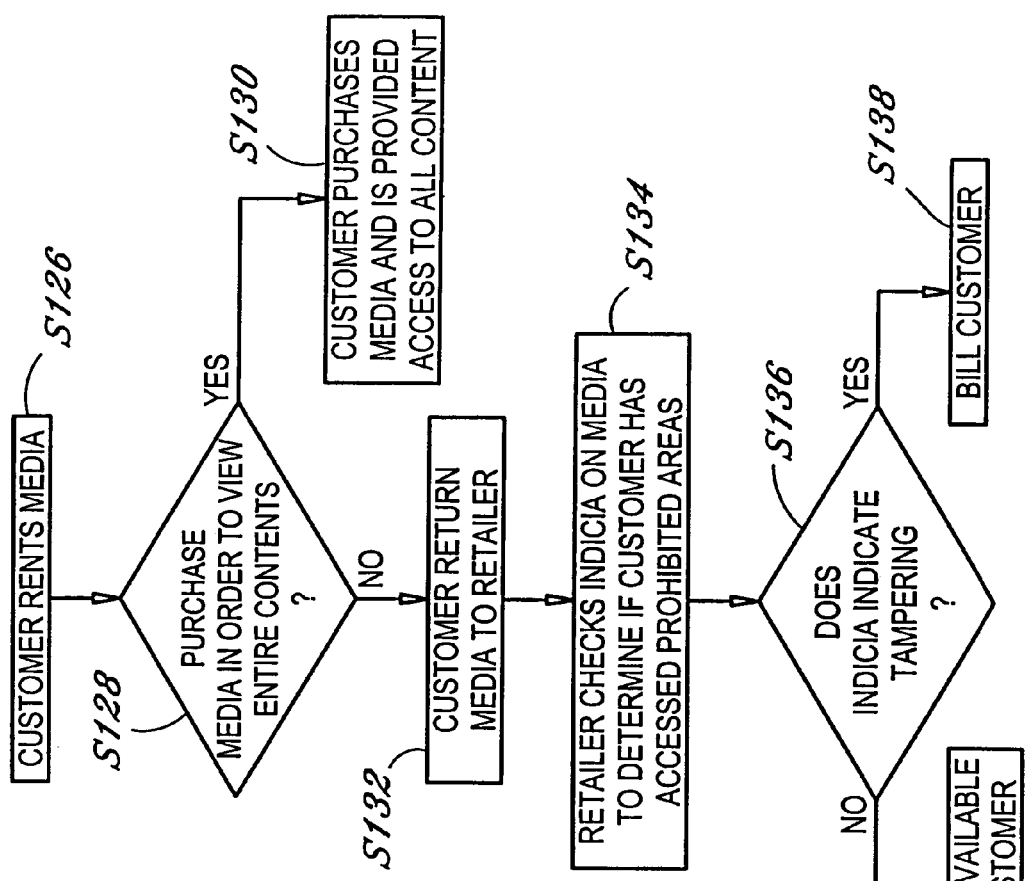
FIG. 6 is a flowchart illustrating the steps taken in an alternate embodiment of the invention.

A specific example of the above embodiment as illustrated in FIG. 6. A customer rents a data storage device containing media from a local retail chain (step S126). The data storage device identified in FIG. 6 could be a movie, video game or musical selections stored on any media storage device. For illustrative purposes, the media storage device may contain complete movie selections as well as movie trailers and clips. The user is presented with access to specific content on the media storage device, i.e. the movie trailers and selected movie clips. After viewing the accessible content, the customer is given the option of purchasing the media device and viewing the actual movies stored thereon (step S128). If the customer wishes to purchase the media device, the retailer can enable the previously inaccessible content and the customer can view the movies (step S130). If the customer does not wish to purchase the media device, he or she simply returns it to the retail store, where it can be made available to other customers (step S132).

The retailer would typically have no way of determining if the customer, via software or manipulative means, accessed the prohibited sections of the device, i.e., the complete movie. Utilizing the present invention, the retailer could examine the key or securing device embedded within the media storage device housing, and if either was removed, i.e. if a frangible tab was broken, the retailer has evidence that the prohibited locations of the device had been accessed (step S134). If the indicia indicates tampering (step S136), the retailer could then notify and/or bill the customer for their unauthorized access (step S138). Otherwise, the media storage device is made available to the next customer (step S140).

In alternate embodiments, a retail store representative inspects the media device returned by each customer and updates that customer's billing records accordingly if the inspection determines that one or more media devices have missing tabs. In another embodiment, the customer reports into the retail store on an "honor system". Thus, if the customer has accessed prohibited memory locations of the media device, he or she can report this access to the retail store, and that customer's account is updated accordingly. When a customer returns the media storage device, the physically-removed tabs or keys will serve as proof of the customer's access to prohibited memory locations, and the tabs represent a receipt or proof of purchase of the prohibited content.

We claim:

1. A system for identifying unauthorized access of portions of a data storage device, the system comprising:
    a solid state data storage device having an outer and inner surface, the data storage device including one or more memory elements;
    a restrictive key coupled to the one or more memory elements and comprising a tab integral with the solid state storage device, the key restricting access to the one or more memory elements, wherein the key is irreversibly alterable from a first state to at least a second state such that physically altering the state of the key provides
        access to the one or more memory elements to which the key is coupled, and
        lasting physical evidence of possible access to the one or more memory elements after the state of the key has been altered; and
    an electrical circuit at least partially positioned within the tab, the electrical circuit disabling access to contents of the memory element to which the electrical circuit is connected, wherein
    removal of the tab enables access to the contents of the memory element and irreversibly alters the key from the first state to the second state.

2. The system of claim 1 further comprising multiple restrictive keys, each of said keys coupled to a corresponding memory element.

3. The system of claim 1 further comprising a securing device, wherein the restrictive key is coupled to a securing device and altering the state of the key visually alters the appearance of the securing device thus providing evidence of possible access to the one or more memory elements.

4. The system of claim 3, wherein at least a portion of the securing device is located on the outer surface of the data storage device.

5. The system of claim 4, wherein the securing device is formed as part of the data storage device during manufacture of the data storage device.

6. An apparatus for providing evidence of possible access to one or more unauthorized memory elements within a solid state data storage device, the solid state data storage device having an outer and inner surface, the apparatus comprising:
    a mechanically manipulative flange coupled to the one or more memory elements, the flange restricting access to the one or more memory elements, wherein the flange is irreversibly alterable from a first state to at least a second state such that physically altering the state of the flange provides
        access to the one or more memory elements to which the flange is coupled, and
        lasting physical evidence of possible access to the one or more memory elements after the state of the flange has been altered, wherein
    the flange comprises a tab integral with the solid state storage device and an electrical circuit at least partially embedded in the tab,
    the electrical circuit disabling access to contents of a memory element to which the electrical circuit is connected, and
    removal of the tab enables access to the contents of the memory element and irreversibly alters the flange from the first state to the second state.

7. The apparatus of claim 6 further comprising a securing device, wherein the flange is coupled to the securing device and altering the state of the flange visually alters the appearance of the securing device thus providing evidence of possible access to the one or more memory elements.

8. The apparatus of claim 7, wherein at least a portion of the securing device is located on the outer surface of the data storage device.

9. The apparatus of claim 8, wherein the securing device is formed as part of the data storage device during manufacture of the data storage device.

10. A method of providing evidence of access to unauthorized memory locations within a data storage device comprising;
    coupling a restrictive key to one or more unauthorized memory locations within the data storage device, the key restricting access to the one or more memory locations, the key is irreversibly alterable from a first state to at least a second state such that physically altering the state of the key provides
        access to the one or more memory locations to which the key is coupled, and lasting physical evidence of possible access to the unauthorized memory locations after the state of the key has been altered, wherein the restrictive key comprises a tab integral with the data storage device, an electrical circuit is at least partially positioned within the tab disabling access to contents of a memory location to which the electrical circuit is connected, and removal of the tab enables access to the contents of the memory location and provides visual evidence that access to the contents of the memory location has been enabled.

11. The method of claim 10 further comprising providing multiple restrictive keys, each of said keys coupled to a corresponding memory location.

12. The method of claim 10 further comprising coupling the restrictive key to a securing device, wherein altering the state of the key visually alters the appearance of the securing device thus providing evidence of possible access to the one or more memory locations.

13. The method of claim 12, wherein at least a portion of the securing device is located on the outer surface of the data storage device.

* * * * *